United States Patent
Kaschemekat et al.

(10) Patent No.: US 7,404,843 B2
(45) Date of Patent: Jul. 29, 2008

(54) GAS SEPARATION MEMBRANE MODULE ASSEMBLY

(75) Inventors: Jürgen Kaschemekat, Campbell, CA (US); Donald Fulton, Fairfield, CA (US); Nicholas Wynn, Palo Alto, CA (US)

(73) Assignee: Membrane Technology & Research Inc, Menlo Park, CA (US)

( * ) Notice: Subject to any disclaimer, the term of this patent is extended or adjusted under 35 U.S.C. 154(b) by 509 days.

(21) Appl. No.: 11/050,995

(22) Filed: Feb. 4, 2005

(65) Prior Publication Data

US 2006/0174762 A1 Aug. 10, 2006

(51) Int. Cl.
*B01D 53/22* (2006.01)

(52) U.S. Cl. .......................... 95/45; 95/51; 95/52; 96/8; 96/10; 210/321.78; 210/321.8; 210/321.88; 210/500.23

(58) Field of Classification Search ............ 96/4, 96/7, 8, 10; 95/45, 51, 52; 210/321.78, 321.79, 210/321.8, 321.88, 321.89, 500.23
See application file for complete search history.

(56) References Cited

U.S. PATENT DOCUMENTS

| | | | |
|---|---|---|---|
| 3,774,771 A | 11/1973 | Manjikian et al. | |
| 4,083,780 A | 4/1978 | Call | |
| 5,238,563 A | 8/1993 | Smith, Jr. et al. | |
| 5,468,283 A * | 11/1995 | French et al. | 96/8 |
| 5,470,469 A * | 11/1995 | Eckman | 96/8 |
| 6,004,383 A * | 12/1999 | Kuhnelt | 96/8 |
| 6,370,887 B1 * | 4/2002 | Hachimaki | 96/8 |
| 6,616,735 B1 * | 9/2003 | Burban et al. | 96/8 |
| 6,632,356 B2 * | 10/2003 | Hallan et al. | 96/9 |
| 6,755,894 B2 * | 6/2004 | Bikson et al. | 96/8 |
| 6,814,780 B2 * | 11/2004 | Bikson et al. | 96/8 |
| 6,887,304 B2 * | 5/2005 | Stroh et al. | 96/8 |
| 7,179,323 B2 * | 2/2007 | Stein et al. | 96/7 |
| 7,255,729 B2 * | 8/2007 | Yamada et al. | 96/8 |
| 2005/0214613 A1* | 9/2005 | Sarkar et al. | 96/10 |
| 2006/0163140 A1* | 7/2006 | Taylor et al. | 96/8 |

FOREIGN PATENT DOCUMENTS

RU 2 187 359 C2 * 8/2002
WO WO 2004/069391 A1 * 8/2004

* cited by examiner

*Primary Examiner*—Jason M Greene
(74) *Attorney, Agent, or Firm*—J. Farrant

(57) ABSTRACT

A gas-separation membrane module assembly and a gas-separation process using the assembly. The assembly includes a set of tubes, each containing gas-separation membranes, arranged within a housing. The housing contains tube sheets that divide the space within the housing into three separate, gas-tight spaces, with the tubes mounted in the central space. Within this space, each tube has an aperture or hole in its wall that enables gas that has been retained on the feed side of the membranes to flow out of the tubes and into the space. The assembly can be used in various ways to carry out gas separation processes.

34 Claims, 8 Drawing Sheets

GAS SEPARATION MEMBRANE MODULE ASSEMBLY

FIELD OF THE INVENTION

The invention relates to gas separation membranes, and specifically to an assembly for gas separation membranes. In particular, the invention relates to an assembly of multiple membrane modules contained in a single housing or pressure vessel.

BACKGROUND OF THE INVENTION

Gas separation membranes have been in industrial use for close to 25 years. Various types of membrane are available, although almost all commercially successful membranes are polymeric membranes formed as flat sheets or hollow fibers.

For use, it is desirable to pack a large membrane area into a small volume. Because membranes are delicate, susceptible to damage and may have a limited operating life, they are normally factory-built into modules or elements.

Two predominant types of membrane modules have emerged. If the membranes are in hollow-fiber form, bundles or hanks of closely spaced fibers are potted in a cylindrical pressure housing or tube. A single hollow fiber module may contain as much as 1,000 km of fiber. Feed gas may flow on the shell or bore side of the fibers. The permeate gas may be routed to a single collection pipe by which it exits the module.

Flat-sheet membranes are commonly packaged into spiral-wound modules. A spiral-wound module has a central perforated permeate collection tube, around which are wound membrane envelopes interleaved with spacers to define feed and permeate channels. The module is usually finished with an outer wrap of fiberglass or the like and mounted in a pressure housing. Feed passes axially down the module across the membrane envelope. A portion of the feed permeates into the membrane envelope, where it spirals towards the center and exits through the collection tube, which may protrude at one or both ends beyond the membrane envelope. Modules typically contain multiple membrane envelopes, such as 20 or more, and have a usable membrane area of up to 40 or 50 $m^2$.

Less commonly, membrane elements may take other forms. For example, they may simply be rigid tubes, such as ceramic tubes, with the selective membrane as the inside or outside surface.

Modules or elements are normally built in standard sizes. Ideally, the standard size module is limited to that which can be manhandled easily by one or two persons, with a weight up to about fifty pounds. The requirement for a specific membrane area is met by installing the appropriate number of factory-made elements in suitable permanent housings. If the membranes need to be replaced in the field, the complete module is removed from the housing and replaced with a new factory-built module. This procedure minimizes any plant downtime required for membrane replacement.

In gas processing plants, gas flows and membrane performance are such that membrane area requirements may be very large, in the range of hundreds, thousands or even tens of thousands of square meters. Large numbers of modules need to be installed in such plants and housed in an effective and economical manner.

In gas separation, individual modules or elements are connected end-to-end, typically in a line of up to about six modules, within a single tube. The tube serves not only to house and support the membrane elements and provide a directed gas flow, but also as the pressure-withstanding vessel that permits operation of the membrane unit at pressures substantially different from the outside atmospheric pressure. The tubes are usually made of stainless or carbon steel, and pressure code-stamped for their intended application.

Various other arrangements have been proposed for arranging multiple membrane modules or elements within a single pressure housing, mostly for reverse osmosis applications.

U.S. Pat. No. 3,774,771 describes an assembly of modules mounted in parallel within a single housing. The modules consist of product tubes around which a piece of reverse osmosis membrane is wound in a helical pattern. Each of these modules is contained within a feed flow tube. The feed flow tubes are connected so that feed can be introduced through an inlet at one end of the housing to several tubes in parallel, can pass down this set of tubes to the other end of the housing, and then pass back along the housing through another set of tubes. Residue is withdrawn from this set of tubes through an outlet adjacent to the feed inlet. Liquid that has permeated the membranes and entered the product tubes is collected and withdrawn through an outlet at the other end of the module.

Each feed flow tube has a hole that allows a volume of feed liquid to leak out from the processing path within the tubes to the space within the housing outside the feed tubes. In this way, pressure is equalized on both sides of the tubes. The assembly is used for reverse osmosis.

U.S. Pat. No. 4,083,780 describes an assembly containing multiple tubes arranged in parallel, with multiple spiral-wound modules in series within each tube.

U.S. Pat. No. 5,238,563 describes an assembly in which multiple membrane modules or elements are housed in parallel. The feed is introduced through a nozzle in the longitudinal shell of the housing and occupies the space between the external surfaces of the modules and the internal surface of the housing.

There remains a need for assemblies that enable gas separation membrane modules to be housed in compact housings that are simple and safe, as well as inexpensive to manufacture, and that provide for easy replacement of modules within the housing. As new gas separation applications develop, some with very large membrane area requirements, this need is more pressing.

SUMMARY OF THE INVENTION

The invention has two aspects: a gas-separation membrane assembly, and a gas-separation process using the assembly. In a basic embodiment, the assembly comprises a set of tubes containing the gas-separation membranes, the tubes being arranged within a single vessel or housing.

In its most general embodiment, the assembly includes the following elements:

(a) a vessel having an outer wall and an interior space, usually elongated, divided into three gas-tight spaces: a first end space, a middle space and a second end space;

(b) a plurality of tubes, each having an interior containing at least one membrane module, the tubes being mounted in the middle space;

(c) three ports in the outer wall, one for each space, that enable gas to flow between an environment outside the vessel and the space;

(d) first means to allow gas flow between the first space and the tubes;

(e) second means to collect a permeate gas from a permeate region of the membrane modules and allow gas flow between the permeate region and the second end space;

(f) third means to allow gas to flow between the interior of the tubes and the middle space.

In light of the teachings presented in this summary and the following detailed description of the invention, it will be apparent to the skilled worker that various essentially equivalent mechanical options are available to achieve the above-defined combination of elements, such as to support the tubes in the space, and to provide the means of gas flow between the designated areas.

The housing may be of any shape and construction appropriate to its function, which is to contain the tubes, and to provide pressure- and gas-tight spaces or environments into which gas can be introduced, and from which it can be withdrawn. Typically the housing is a steel pressure vessel with two ends and an elongated central section, adapted to withstand the relatively high differential pressures that are used in gas separation, and pressure code-stamped accordingly.

Most preferably, the vessel is a cylindrical shell with two ends. At least one of these ends should preferably take the form of a reversibly removable head.

The tubes containing the gas-separation membranes are mounted in the housing, usually in a longitudinal direction, that is, parallel to a long axis of the housing and to each other.

The tubes are usually mounted in the housing by means of tube sheets, which support the tubes directly or indirectly at or near one or both of their ends in any convenient manner. The tube sheets also provide the most convenient means to divide the interior of the vessel into defined spaces. The tube sheets are aligned generally perpendicular to the longitudinal axes of the housing and the tubes, thus dividing the space within the housing into three discrete spaces—a first, or feed, space at one end of the housing, a second, or permeate, space at the other end, and a third, or residue, central space occupying the shell or central portion of the housing. The tubes are mounted in this central space.

The housing and tube sheets are connected in gas-tight relationship with each other, so that gas cannot bypass the tubes and flow directly between the three spaces.

The housing is equipped with three ports or nozzles: a first, or feed, port at one end opening into the first or feed space; a second, or permeate, port at the other end opening into the second or permeate space; and a third, or residue, port in the central section or shell opening into the third or residue space. Through these nozzles, feed gas can be introduced into the housing, and treated gas can be withdrawn from the housing.

The tubes contain gas-separation membranes, usually arranged as one or more membrane elements or modules of any type. The membranes may be any type of membrane usable for gas separation, including, but not limited to, polymeric membranes with a rubbery selective layer and polymeric membranes with a glassy selective layer.

The modules include a permeate collection pipe, through which gas that has permeated the membranes can be collected and withdrawn. Most preferably, the membranes are flat-sheet membranes packaged as spiral-wound modules.

The tubes may contain a single module or, more preferably, multiple modules with their permeate pipes connected end-to-end, so that permeate gas leaving one membrane element can flow into the permeate collection pipe of the next membrane element, and so on.

The tube sheets may support the tubes in any convenient manner. Thus, the tubes may butt against the tube sheets, fit into holes, grooves or lips in the tube sheets, or protrude through holes in the tube sheets, for example.

The tubes are aligned with sets of openings or holes in the tube sheets to allow gas to pass between the tubes and the feed space, and to allow permeate gas to reach the permeate space.

To allow the modules to be inserted into, and removed from, the tubes, the set of openings at the feed end, the permeate end or both ends should be large enough for the modules to pass through. At the end adjacent to the first or feed space, the tube sheet typically has openings of about the same diameter as the tubes. At these feed ends, the tubes are open to gas flow from or to the feed space.

The feed-end tube sheet and the tubes engage one another to form a gas-tight seal, to prevent leakage of gas directly between the feed space and the residue space. The seal can be made in a reversible or permanent manner.

At the other, or permeate, ends of the tubes, the permeate collection pipes, or extensions thereof, protrude beyond the tubes. It is not required that the tubes make a gas-tight seal against the tube sheet at this end. Indeed, it is not required that the tubes reach the tube sheet at this end, in which case the permeate-end tube sheet does not support the tubes directly, but only indirectly by means of the permeate pipes.

The tubes are adapted to allow gas that has passed across the membranes to flow out of the tubes into the third or residue space. That is, at or near the permeate end, the tubes are at least partially open to the residue space.

As a preferred example, each tube has an aperture or hole in its long, cylindrical surface. This aperture is usually positioned near the permeate end of the tubes. As one alternative example, the tubes may be of shorter length than the distance between the tube sheets, so that there is a gap at the permeate end between the end of the tube and the tube sheet, as mentioned above.

The permeate collection pipes or their extensions fit through openings or holes in the permeate-end tube sheet to allow gas that is in the pipes to flow to the second or permeate space. A preferred arrangement is that the tube sheet contains openings just large enough that the permeate pipes, their extensions and couplings can fit into or through the openings. This arrangement facilitates close placement of the tubes, as well as easy removal of modules for maintenance or replacement. The arrangement includes a gas-tight seal between the permeate pipe and the permeate-end tube sheet, to prevent leakage of gas from the residue space to the permeate space.

The tube sheets may be of any material and thickness appropriate to their function. The tube sheet that divides the residue space from the permeate space must be capable of withstanding the pressure difference between the gases occupying these two spaces. This pressure difference may be high, such as several hundred psi or more.

During operation of the assembly in a gas-separation process, there is usually little pressure drop between the feed and residue gas streams, and hence little pressure difference between the gas in the feed and residue gas spaces. In this case, the feed-end tube sheet need not be resistant to high pressure differences, and can be made relatively thin, or of a relatively light, inexpensive material.

Likewise, because the tubes divide the feed side of the membranes from the residue space, they do not need to withstand high pressure differences and can be made from relatively thin, light materials.

Although elements or features of the assembly have been qualified above by the adjectives "feed" or "residue", this has been done for ease of explanation, and does not mean that the assembly has, necessarily, to be used with the feed gas entering at the feed port and the residue gas leaving through the residue port. The assembly can be operated in various ways. This point is discussed further in the detailed description below.

The gas separation assembly of the invention uncouples the two primary functions of the conventional pressure tubes. The modules are contained and the gas flow is directed by the tubes, which need not be pressure rated or code-stamped for high pressure differences. These tubes may be made from many types of standard, off-the-shelf seamless piping, or may be manufactured to much lower pressure-rating than the housing. The pressure-withstanding function is now fulfilled by the outer vessel or housing, within which the multiple tubes are contained.

Furthermore, because of the plurality of tubes, the assembly allows large numbers of standard size modules to be accommodated in a single housing. Because the gas feed, residue and permeate connections to the plurality of tubes are internal to the assembly, complex external piping and manifolding systems are not required. The assembly itself fulfills this function, but in a more effective way.

Conventional systems using individual pressure tubes connected by external piping are complex, require much space, and are costly to build. This is especially so in gas processing because the materials being processed are normally hazardous and their safe containment is an absolute necessity.

If these connections are made internal to the pressure vessel, the pressure vessel itself provides the containment in a more robust and compact manner than external piping, and with fewer flanges, gaskets, joints and connectors. The greater simplicity allows faster access, and correspondingly less down time, to replace membrane modules, as well as reducing potential for leakage of hazardous materials. In particular, the number of pipes, flanges and connections is reduced enormously. For example, if the housing contains seven membrane module tubes, the number of flanges and connecting pipes is reduced seven-fold.

Thus, this uncoupled arrangement offers a number of advantages compared with conventional pressure housing of membrane modules in a single linear arrangement.

The assembly is also lighter in weight than a conventional array of tubes containing the same amount of membrane area, because only the one outer vessel, rather than each tube, need be built to high-pressure-resistant specification. In addition, heat tracing or insulation of the modules is greatly simplified.

These differences result in very substantial savings in terms of manufacturing complexity and capital cost of equipment.

To achieve these benefits, a preferred embodiment of the assembly comprises:
(a) a plurality of tubes each having a longitudinal tube wall and an interior containing gas separation membranes;
(b) a housing containing the tubes, the housing comprising a feed end, a permeate end and a central portion between the ends;
(c) a feed-end tube sheet mounted in the housing towards the feed end;
(d) a permeate-end tube sheet mounted in the housing towards the permeate end;

the tube sheets dividing the interior of the housing into three separate gas-tight spaces: (i) a feed gas space at the feed end, (ii) a permeate gas space at the permeate end, and (iii) a residue gas space in the central portion between the feed and permeate spaces, and in which the tubes are mounted in spaced-apart relationship with each other;

the feed-end tube sheet having a plurality of feed openings that provide gas-transferring communication between the interior and the feed gas space; and the permeate-end tube sheet having a plurality of permeate openings that provide gas-transferring relationship between the membranes and the permeate end space;

(e) a feed gas port at the feed end;
(f) a permeate gas port at the permeate end;
(g) a residue gas port in the central portion;
(h) at least one aperture in each longitudinal tube wall enabling residue gas to flow from the interior of the tube to the residue gas space.

A most preferred embodiment of the invention comprises:
(a) a plurality of tubes, each having a longitudinal tube wall and an interior containing at least one spiral-wound membrane module, the module having a permeate pipe around which is wound at least one gas separation membrane, leaving an end of the permeate pipe protruding from the membrane;
(b) a housing containing the tubes, the housing comprising a removable feed head, a removable permeate head and a shell between the heads;
(c) a feed-end tube sheet mounted in the housing towards the feed head, the feed-end tube sheet containing a feed opening for each tube of a first diameter approximately the same as the tube, the tubes being aligned over the feed openings and attached to the feed-end tube sheet so as to provide a gas-tight seal between the tubes and the feed-end tube sheet;
(d) a permeate extension pipe, connected to the permeate pipe by a connector, the connected pipes protruding longitudinally out of the tube;
(e) a permeate-end tube sheet mounted in the housing towards the permeate head, the permeate-end tube sheet containing a permeate opening for each permeate extension pipe of a second diameter approximately the same as the connector, and large enough to permit the connector and the permeate extension pipe to slide through the permeate opening;
(f) an end plate attached to the permeate extension pipe and reversibly sealed to the permeate-end tube sheet in gas-tight manner around the permeate openings; the tube sheets dividing the interior of the housing into three separate gas-tight spaces: (i) a feed gas space adjacent to the feed head, (ii) a permeate gas space adjacent to the permeate head, and (iii) a residue gas space inside the shell between the feed and permeate spaces and containing the tubes;
(g) a feed gas port in the feed head;
(h) a permeate gas port in the permeate head;
(i) a residue gas port in the shell;
(j) at least one aperture in each longitudinal tube wall enabling residue gas to flow from the interior of the tube to the residue gas space.

In its second aspect, the invention is a gas-separation process using the assembly in any of its embodiments. The process may be used to separate components of any gas mixture, and is expected to be especially useful in natural gas treatment applications, where gas flow rates tend to be large and gas pressures high.

BRIEF DESCRIPTION OF THE DRAWINGS

FIG. 8(a) represents an assembly using conventional pressure tubes, and not in accordance with the invention. FIG. 8(b) represents an assembly of the invention using vessels housing seven tubes, and FIG. 8(c) represents an assembly of the invention using vessels housing 19 tubes.

DETAILED DESCRIPTION OF THE INVENTION

Figure 1:
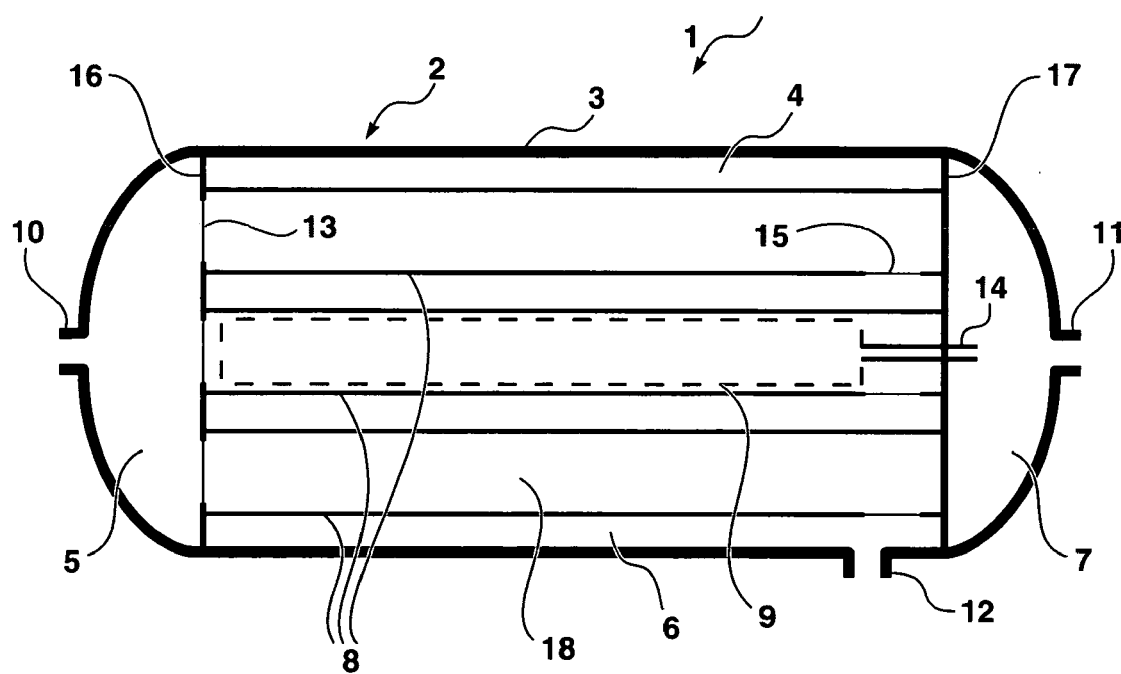
FIG. 1 is a schematic drawing showing a longitudinal section through the assembly of the invention.

The invention is a gas-separation membrane assembly, and a gas-separation process using the assembly. The assembly incorporates multiple gas-separation membranes in an array within a single vessel or housing, the terms vessel and housing being used interchangeably herein.

Feed gas to be treated by membrane separation can be introduced into the housing; the separated, treated gas can be withdrawn from the housing.

The vessel may be of any form appropriate to its function, which is to provide an internal environment in which membrane gas separation can be carried out safely at substantially different (higher or lower) pressures than the outside atmospheric pressure.

A variety of vessel shapes are possible within the scope of the invention, although typically the housing is of elongated form. Most preferably the housing takes the form of a cylindrical vessel, that is, a vessel having a cylindrical shell and two ends.

At least one of the ends, and optionally both, should be a reversibly removable end cap or head to provide access to the ends of the tubes for installation or removal of membrane modules. By this, we mean that the head should not be a unitary part of the cast vessel, nor attached by welding, but should be bolted, screwed, or the like, to the vessel.

The end caps may have any appropriate profile, but usually will be flat or domed. Removable heads typically include a flange or flanges or a screw thread for attachment to the shell body of the vessel.

Many gas separations, such as those used to bring natural gas to pipeline specification, are performed with the feed gas to the membrane units at elevated pressure, such as above 150 psig, above 300 psig, above 500 psig or even up to 1,000 psig or more. The permeate gas may also be maintained at above atmospheric pressure in some cases, or may be under vacuum in others. Thus, considerable pressure differences frequently exist between the outside and inside of the vessel, and between spaces within the vessel, and the vessel should be pressure-rated and code-stamped accordingly. For convenience herein, we refer to gas separation applications in which the vessel is pressure-rated or code stamped for pressures in the hundreds of psi as intermediate-pressure applications and gas separation applications in which the vessel is pressure-rated or code-stamped for pressure of 1,000 psi or above as high-pressure applications.

The material of which the vessel is formed may vary depending upon the use to which it is to be put and the pressure-rating required. Typically the vessel will be metal, usually steel, either stainless or carbon, although other metals, or even non-metallic materials, could be used in some circumstances.

The housing is equipped with three ports or nozzles, through which gas may enter or leave. The nozzles are positioned to provide gas flow into or out of each of the three discrete gas-tight spaces within the vessel, which are explained below. Preferably, the nozzles are located one at each end of the vessel and one in the shell near an end.

Within the housing are multiple tubes that carry the membrane modules and provide a directed path for gas flow.

In principle, many ways to arrange the tubes within the interior space of the vessel can be imagined within the scope of the invention. Based on size, weight and cost considerations, however, the tubes should be packed efficiently into the housing, so as not to leave large volumes of space unoccupied by the tubes.

The preferred arrangement is to align the tubes approximately parallel to each other and to the long axis of the shell of the housing, so that a large number of tubes may be accommodated by a vessel of comparatively small cross-section. As described below, the invention includes additional features that facilitate close packing of the tubes.

The tubes are held in the vessel by means of tube sheets, which support the tubes directly or indirectly at or near one or both of the tube ends. Thus, the tubes occupy the central or shell portion of the vessel. The tube sheets are aligned generally perpendicular to the longitudinal axes of the housing and the tubes, and divide the volume within the housing into three discrete spaces-a first space at one end of the housing, a second space at the other end, and a third space occupying the shell or central portion of the housing and itself partially occupied by the tubes.

For ease of nomenclature and clarity of explanation, in the discussion that follows the first space is designated the feed space, the second space is designated the permeate space, the third space is designated the residue space, and elements or features of the assembly in or near those spaces are identified similarly. However, it should be noted that this nomenclature is used because it describes conveniently a mode in which the inventors prefer to operate the assembly for gas separation, not because it describes intrinsic properties of the spaces.

The vessel and tube sheets are connected in gas-tight relationship with each other, so that gas cannot bypass the membrane-containing tubes and flow directly between the three spaces. The tube sheet that divides the feed space from the residue space is referred to hereinafter as the feed-end tube sheet; the tube sheet that divides the residue space from the permeate space is referred to hereinafter as the permeate-end tube sheet. The tube sheets may be permanently or removably secured to the vessel in any known manner. Preferably, at least the permeate-end tube sheet is welded to the vessel, and most preferably both tube sheets are welded in place.

The tube sheets are typically, but not necessarily, made of the same material as the vessel, such as steel. During operation of the assembly, the permeate end tube-sheet is subjected to whatever pressure difference is maintained between the feed/residue gases and the permeate gas. This tube sheet needs to be pressure-rated accordingly, and will often have to withstand a pressure difference of several hundred psi or more.

The feed-end tube sheet is subjected only to whatever pressure drop occurs from the feed gas to the residue gas, which is usually no more than a few psi, for example 50 psi, 20 psi or less. This tube sheet can be relatively thin and lightweight, therefore.

Likewise, the tubes themselves need only withstand the slight feed-to-residue pressure drop and can be made much thinner and lighter than conventional, industrial gas-separation tubes. That the individual tubes need not serve any significant pressure-withstanding function is one of the benefits of the invention, and reduces the manufacturing cost of high-pressure gas separation systems substantially.

In our invention, the functions of the tubes include carrying the membranes, usually arranged as membrane modules, and directing gas flow. Each tube may contain a single membrane module, also referred to herein as a membrane element or cartridge, but usually and preferably contains multiple modules or elements. Most preferably, each tube contains at least two, and no more than about six membrane elements.

The type and configuration of the membranes and modules is not a limiting aspect of the invention; any types of membranes and modules known in the gas separation arts can be housed in the present assembly. The membranes may be any type of membrane usable for gas separation, including, but not limited to, polymeric membranes with a rubbery selective layer and polymeric membranes with a glassy selective layer.

Most commonly, industrial gas separation membranes are prepared as hollow fibers and packaged as potted hollow-fiber modules, or prepared as flat sheets and packaged as spiral-wound modules. As a less common example, they may be in tubular form, with the selective membrane on the inner or outer surface. This type of module is sometimes used when the separation membranes themselves are inorganic, or are supported on an inorganic support membrane, for example.

These forms are well known in the art and are described copiously in the literature. For simplicity, therefore, the details of module placement and connection, and gas flow around and within the modules, are described below as they relate to polymeric membranes packaged as spiral-wound modules. Those of skill in the art will appreciate that similar arrangements of modules within the tubes and housing can be used for hollow-fiber modules or other arrangements, subject only to minor, straightforward modifications as need be.

As mentioned in the background section, a spiral-wound module comprises one or more membrane envelopes of spacers and membrane wound around a perforated central permeate collection pipe. Typically, the pipe protrudes a short distance beyond the membrane envelopes. When the module is in use, feed gas passes axially down the module across the membrane envelope. A portion of the feed permeates into the membrane envelope, where it spirals towards the center, is drawn through the perforations into the permeate collection pipe and exits through the end of the pipe. The residue gas exits the module axially at the opposite end from that at which the feed gas is introduced.

If a tube contains multiple modules, the modules are connected end-to-end, meaning that permeate gas leaving one module can flow into the permeate channel of the next module. This can be achieved by having one long continuously formed pipe around which multiple membrane modules are wrapped. More preferably, however, the permeate pipes of the individual modules are separate pipes joined by gas-tight connectors or couplings.

Most preferably, these couplings join the permeate pipes in a reversible manner, so that an individual membrane element can be removed and replaced as necessary. For example, the connectors may be flanged or screwed. More commonly they take the form of proprietary quick-release fittings of clamped or compression design, such as TriClover® or Swagelok® fittings, or are simple bayonet fittings with simple O-ring seals.

The inside diameter of a tube is usually, and preferably, only marginally larger in diameter than the outer diameter of the membrane module(s) that it contains, so that the modules, with their permeate pipes connected, can simply be pushed into the tubes, where they fit snugly without additional support. An elastomeric seal, or the like, is normally fitted around the circumference of the modules to provide a gas tight fit to prevent incoming gas bypassing the module. In this case, gas introduced from the feed space into a tube enters the feed end of the first membrane module, passes along the module and exits at the residue end into the space within the tube between the first and second modules. The gas flowing through this space forms the feed to the second module, and so on.

As an alternative, the modules can be spaced a distance from the inner wall of the tube, such as by means of a perforated inner tube of smaller diameter, so that gas entering the tube from the feed space may flow directly into any and all of the first, second or subsequent membrane elements in a parallel flow configuration.

The tube sheets may support the tubes in any convenient manner. Thus, the tubes may butt against the tube sheets, fit into holes, grooves or lips in the tube sheets, or protrude through holes in the tube sheets, for example. The tubes are usually aligned with holes in the tube sheet to permit gas to leave the feed space at one end, and to enter the permeate space at the other.

The feed-end tube sheet divides the feed space and the residue space. In the preferred mode of operating the assembly, gas flows into the housing through the port at the feed end, and from there enters the open feed ends of the tubes and the first membrane module.

Also preferred is that the membrane elements be installed in the tubes from the feed end. Thus, it is convenient, and preferred, that the feed-end tube sheet has openings or holes with diameters about as large as the diameter of the tubes. This not only enables membrane modules to be inserted and removed easily, but also presents a broad cross-section open to incoming gas flow. Also, in this case, the feed end of the housing should be a removable head.

At this end, the tubes and tube sheet engage one another to form a gas-tight seal, to prevent leakage of gas from the feed space directly to the residue space. The seal can be made in a reversible manner, such as by means of a gasket, or may be permanent, such as adhesive or welding. In general, it is preferred that the seal be permanent, and specifically that the tubes and tube sheet be welded or glued together.

At the other, or permeate, ends of the tubes, the permeate collection pipes, or extensions thereof, protrude beyond the tubes. The permeate collection pipes or their extensions fit against, into or through openings or holes in the permeate-end tube sheet, in any manner that allows gas that is in the pipes to flow to the permeate space. A gas-tight seal is provided between the tube sheet and the outer surface of the permeate pipes or extensions, to prevent gas flow from the residue space to the permeate space via the annular gap around the pipe or pipe extension.

The seal may be permanent, if the vessel itself is permanently closed at the permeate end for example.

More preferably, the seal is removable, and is made using a plate or flange attached to the permeate pipe extension and bolted or screwed against the tube sheet, using a gasket or O-ring to ensure a gas-tight seal. The tubes are spaced at least sufficiently far apart to accommodate the bolts or screws in the portions of the tube sheet between the tubes. In this case, the permeate end of the housing should take the form of a removable head.

As another alternative, a bayonet-type seal, that is an elastomeric seal through which the permeate pipe or permeate pipe extension is pushed and that closes around the pipe in gas-tight fashion, can be used. In this case, it is not necessary that the permeate head be removed when installing or removing membrane modules, and the permeate end of the vessel could optionally be welded in place, or the vessel could be cast with a unitary permeate end.

The openings or holes in the permeate-end tube sheet may be of the same size as those in the feed-end tube sheet, so that both end of the tubes are unobstructed by the tube sheet.

It is preferred, however, that the openings in the permeate-end tube sheet are smaller in diameter than the diameter of the tubes. This provides two advantages. First, the tube sheet is stronger mechanically, as more of its total area is solid. This is beneficial, as this tube sheet frequently has to withstand a pressure difference from the residue space side to the permeate space side of several hundred psi. Secondly, the seal or end plate can be much smaller in diameter, enabling the tubes to be packed closer together.

A particularly preferred arrangement is that the tube sheet contains openings just large enough that the permeate pipes or their extensions and their couplings can fit into or through the openings. This arrangement facilitates close placement of the tubes, as well as easy removal for maintenance or replacement.

The tubes are adapted to allow gas that has passed across the membranes but has not permeated the membranes to flow out of the tubes into the residue space. That is, the tubes are at least partially open to the residue space, normally at or near the permeate end. In this way, the tubes are not subjected to a large pressure difference across their walls. The tubes may be made from off-the-shelf seamless piping, for example, or may be manufactured to much lower pressure-rating than was required for the pressure tubes of prior art gas separation systems. The pressure-withstanding function is now fulfilled by the outer vessel or housing, within which the multiple tubes are contained.

As one example adaptation, each tube has at least one aperture or hole in its long, cylindrical surface. This aperture is usually positioned near the permeate end of the tubes. The aperture should be large enough that it does not present a significant resistance to gas flow. Typically, the aperture may be an inch or two in diameter, for example. As desired, one or multiple apertures in each tube may be used.

As another alternative, the tubes may be of shorter length than the distance between the tube sheets, so that there is a gap between the end of the tube and the tube sheet, through which gap the residue gas may flow into the residue space. In this case, the permeate-end tube sheet does not support the tubes directly, but only indirectly because the permeate pipes or extensions pass through it.

Yet other methods of allowing for gas flow from the interior of the tubes to the residue space, such as providing notches or slits in the end of the tube, so that only part of the tube contacts the tube sheet, and so on, will be apparent to those of skill in the art.

Whichever method is used, it is not necessary that the tubes make a gas-tight seal against the tube sheet at the permeate end. Most preferably, however, the tubes should at least contact the permeate-end tube sheet in such a manner that they are mechanically supported by the tube sheet. Convenient options include, but are not limited to, welding the tubes to the permeate-end tube sheet, or locating the tubes in a recess machined into the face of the permeate-end tube sheet that faces the residue space.

A basic embodiment of the invention, including the elements or main features of the assembly, is shown as a simplified schematic drawing of a lengthwise section in FIG. 1. Referring to this figure, the assembly is generally indicated by numeral 1, and includes a vessel, 2, containing a plurality of tubes, 8. The vessel or housing has an outer wall, 3, and an interior space, 4. Space 4 is divided by dividing means, 16 and 17, into three gas-tight spaces: a first end space, 5, a middle space, 6, and a second end space, 7. The dividing means typically take the form of perforated plates that also serve as tube sheets to support the tubes, but could also take any other form that separates spaces 5 and 6 in a gas-tight fashion.

Tubes 8 are mounted in the middle space, 6. Each tube has an interior, 18, containing at least one membrane module, 9. For clarity, the membrane module(s) are only indicated on the drawing in the center tube.

The vessel includes three ports, 10, 11, and 12, in the outer wall, one port accessing each gas-tight space within the vessel. The ports enable gas to flow between environments outside the vessel, such as pipes, and the spaces within the vessel.

The ends of the tubes are adapted to allow gas flow between the first space and the tubes by means generally indicated by numeral 13. Typically, means 13 is achieved simply by leaving the ends of the tubes open and providing openings of any convenient size, shape and number in dividing means 16.

The assembly is adapted by means, 14, to collect permeate gas from the membrane modules and allow this gas to flow into space 7. Typically, this is achieved by collecting the permeates from the modules within a tube into a single pipe emerging from the tube, which pipe transects dividing means 17. Many alternatives in terms of how the pipes are connected, and how they cut across means 17, are possible within the scope of the invention.

The assembly is further adapted by means, 15, to allow gas to flow between the interior of the tubes and the middle space 6. For clarity, this means is shown in the figure as an aperture or hole in the tube wall, but multiple openings or slits, one or more notches in the tube end, a gap between the tube and the tube sheet or dividing means, and the like, are within the adaptations contemplated by the inventors.

Figure 2:
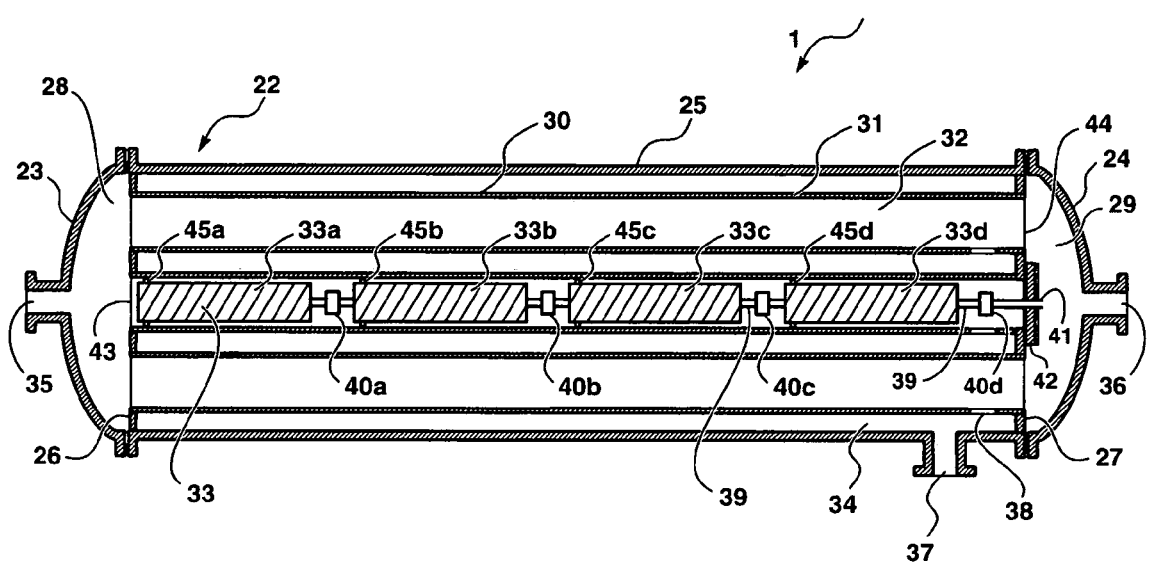
FIG. 2 is a schematic drawing of a preferred embodiment of the invention in a longitudinal central section.

A preferred embodiment of the invention is shown in longitudinal central section in FIG. 2. Referring to this figure, the assembly, again generally indicated by numeral 1, includes a housing or vessel, 22, containing a plurality of tubes, 30, in this case three tubes, of which only the top one is labeled to avoid long lead lines over other parts of the drawing.

The housing has a feed end, 23, a permeate end, 24, and a central portion, 25, shown as a cylindrical shell. In the drawing, the feed and permeate ends are shown in the most preferred form of removable flanged heads, connected to the body of the shell by bolts (not shown). However, any convenient means of connection of the ends is intended to be within the scope of this embodiment, and in some variants, discussed below, only one end need be removable.

A feed port, 35, is positioned in feed end 23; a permeate port, 36, is positioned in permeate end 24; and a residue port, 37, is positioned in the central portion or shell.

Each tube, 30, has a longitudinal tube wall, 31, and an interior, 32, containing gas-separation membranes, 33, shown here in the form of four membrane elements, 33a-d, arranged in line along the tube. The membrane elements each have a permeate pipe, 39, protruding from one or both ends, and the pipes are connected in line by connectors, 40a-c. An extension pipe, 41, is attached to the last permeate pipe in the series by connector 40d. The modules are sealed against the tube walls by annular seals 45a-d.

As in FIG. 1, for clarity, the membrane module(s) are only indicated on the drawing in the center tube. Three tubes are visible in the central longitudinal section of FIG. 2, representing an assembly with 7 tubes in total, shown in axial view as a layout diagram in FIG. 5, discussed below. Each tube has an aperture, 38, in wall 31, through which gas may flow between the tube interior and residue space 34.

A feed-end tube sheet, 26, is welded or otherwise mounted in the housing towards the feed end. This tube sheet is perforated by openings, 43, of about the same diameter as the ends of the tubes. At this end, the tubes and tube sheets are joined by adhesive or by welding, so that the tube sheet supports the tubes in spaced-apart relationship with each other.

A permeate-end tube sheet, 27, is welded or otherwise mounted in the housing towards the permeate end. This tube sheet is perforated by openings, 44, again of about the same diameter as the tubes. This tube sheet is thicker than the feed-end tube sheet, 26, because it has to withstand a greater pressure difference.

The tube sheets divide the interior of the housing into three separate gas-tight spaces: a first or feed gas space, 28, a second or permeate gas space, 29, and a central or residue gas space, 34, between the tube sheets, this space being partially occupied by the tubes, which are held in place by the tube sheets.

Extension pipe 41 projects through an opening 44 into permeate gas space 29. Welded or otherwise attached to the extension pipe is annular end-plate, 42, that makes a gas-tight seal against the tube sheet, 27, by screwing, bolting or the like.

In the embodiment shown in FIG. 2, both tube sheets have openings that correspond in width to the tube diameter, and both heads are drawn as removable. This arrangement provides the greatest flexibility for assembling the unit, either initially or after maintenance or repair, because the membrane elements can be loaded into the tubes, or taken out of the tubes, from either end.

If less flexibility is needed, this design can be simplified by permanently welding end 23 to the body of the vessel or manufacturing it as a unitary part of the body of the vessel, instead of as a removable head. The modules must then be loaded or unloaded from the permeate end only, but the manufacturing cost of the vessel may be reduced.

Figure 3:
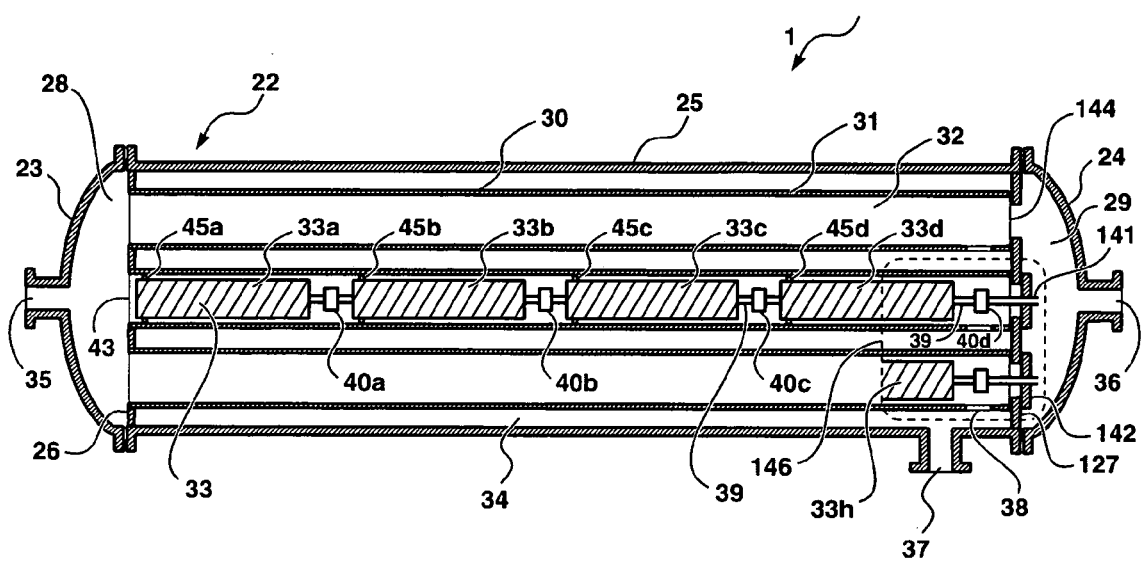
FIG. 3 is a schematic drawing of a most preferred embodiment of the invention in a longitudinal central section.

In a most preferred embodiment, smaller openings in the permeate-end tube sheet are used. FIG. 3 shows such an embodiment. Referring to this figure, elements identical to those of the FIG. 2 embodiment are numbered as in FIG. 2, and reference should be made to the description of FIG. 2 for explanation of those elements.

With reference to FIG. 3, it may be seen that permeate-end tube sheet, 127, has openings, 144, that are smaller in diameter than the diameter of tubes 31. Through these openings protrude extension pipes, 141, to which are attached end plates, 142. An expanded view of the portion of FIG. 3 within the area defined by dashed line 146 is shown in FIG. 4.

Figure 4:
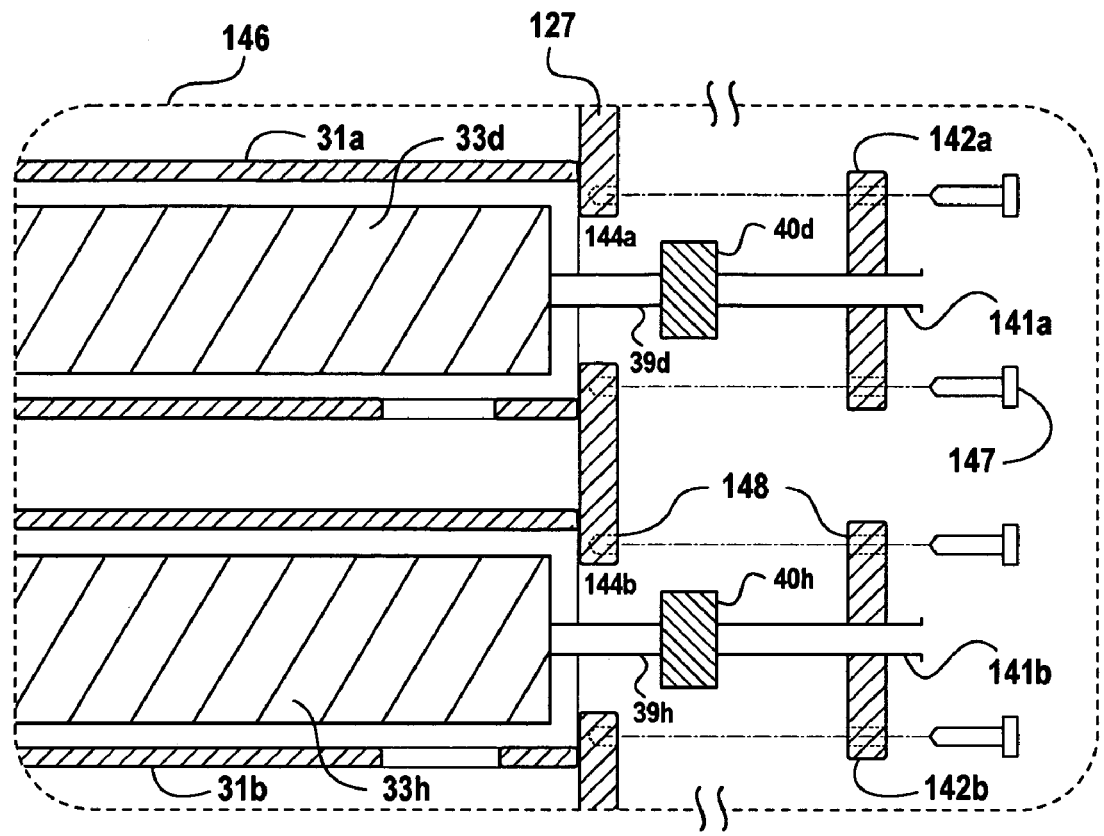
FIG. 4 is an expanded view of the portion of FIG. 3 within dashed line 146, showing the arrangement of elements at the permeate-end tube sheet.

Referring to FIG. 4, the expanded area within dashed line 146 includes the ends of two adjacent tubes, 31a and 31b, within the assembly. Tube 31a corresponds with the center tube in FIG. 3 and is assumed to contain membrane elements 33a through 33d. The end of membrane element 33d is shown. Likewise tube 31b is assumed to contain four membrane elements, and the end of the last membrane element, 33h, is shown.

Permeate-end tube sheet 127 is equipped with openings 144a and 144b. The openings are smaller than the tube diameters, but just large enough to enable connectors, 40d and 40h, to slide through easily. The connectors couple the ends of permeate collection pipes, 39d and 39h, to extension pipes, 141a and 141b.

Attached to the extension pipes are end plates, 142a and 142b. As can be seen, the end plates are considerably smaller in diameter than the end plates 42 in FIG. 2, and have a diameter no larger than the diameters of the tubes. Tube sheet 127 and end plates 142a and 142b are equipped with bolt holes 148, through which they may be are fastened together by bolts, 147. The bolt holes are positioned in the portion of the tube sheet that overlaps the ends of the tubes, not in the portion of the tube sheet between the tubes. O-rings or gaskets, not shown, may be used to make a gas-tight seal between the tube sheet and end plates.

In the embodiment shown in FIGS. 3 and 4, both heads are drawn as removable. To remove modules from a tube, 31a for example, the permeate head is removed, end plate 142a is unbolted and pulled away from the tube sheet to the position shown in FIG. 4. This exposes coupling 40d, which can be opened, so that extension pipe 141a and permeate pipe 39d can be separated. The feed head is also removed, and the modules are then pulled out through opening 43.

If a vessel with only one removable head is required, the design of FIG. 3 may be adapted by permanently welding end 24 to the body of the vessel or manufacturing it as a unitary part of the body of the vessel, instead of as a removable head. The bolted end-plate should then be replaced by a seal from which the permeate pipe or permeate pipe extension may be disconnected by pulling towards the feed end. For example, a bayonet-type seal, as described above, can be used. The modules may then be unloaded or reloaded simply by removing the feed head.

The arrangement shown in FIG. 4 enables the tubes to be extremely closely packed, as space is not needed in the solid portion of the tube sheet between the tubes for overlapping the ends plates and securing the bolts. This provides for a higher packing efficiency of the tubes within the housing than would otherwise be possible, enabling a vessel of smaller overall diameter to be used.

FIGS. 2, 3 and 4 show specific embodiments that demonstrate the best mode contemplated by the inventors of realizing their invention. It will be seen that a number of permutations and combinations of the arrangement of features at the feed and permeate end is possible, and that a number of equivalent arrangements could readily be developed. These figures are intended to be representative, not limiting, of the invention.

Figure 5:
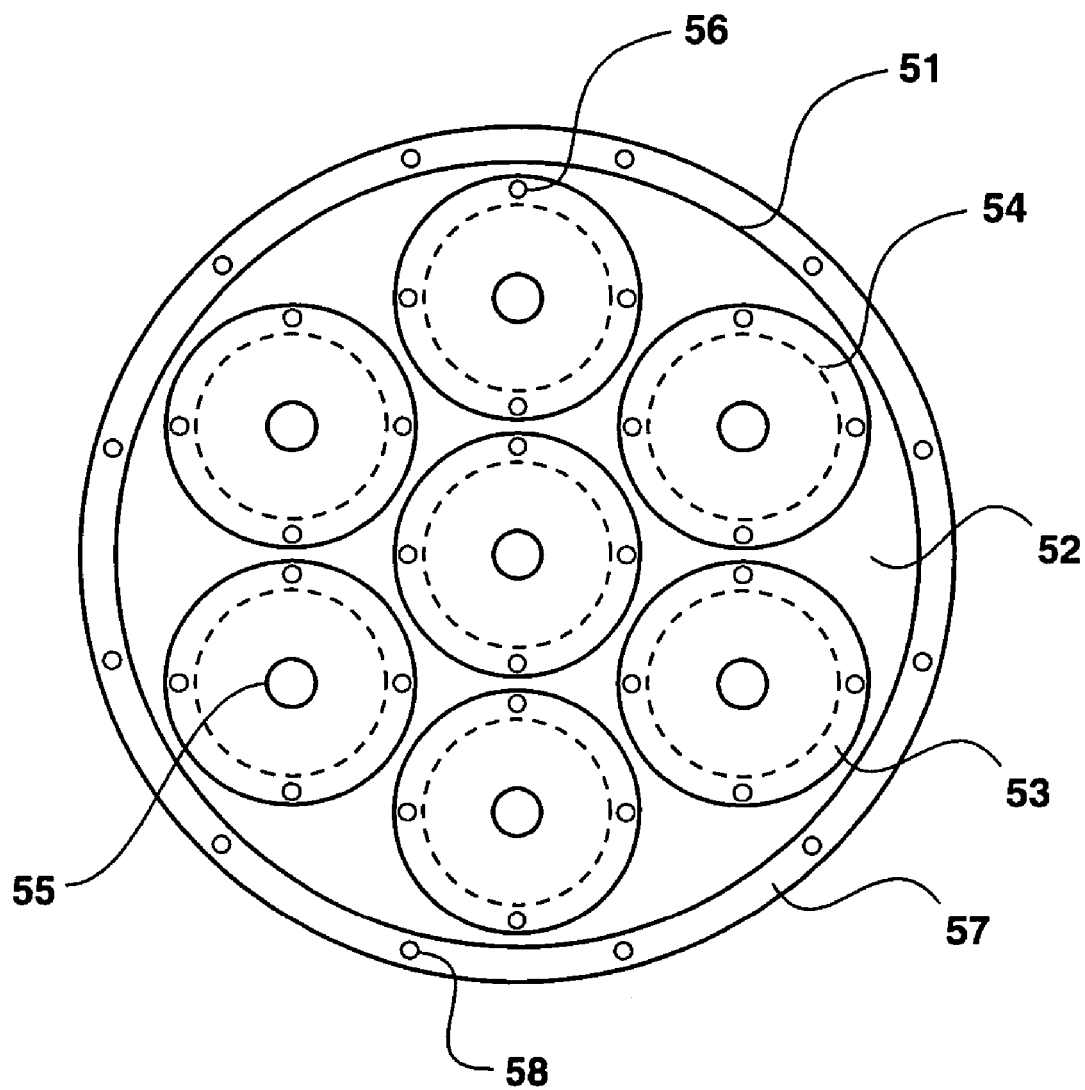
FIG. 5 is a schematic cross-sectional drawing showing attachment of the end plates in an embodiment in which the permeate-end tube sheet has opening of the same diameter as the tubes.

FIG. 5 shows a cross-sectional layout diagram of a preferred assembly containing seven tubes. The cross-section shows the placement of the end caps over the openings in the permeate-end tube as would be viewed looking at the permeate end of the assembly with the permeate end cap or head removed. In this embodiment, the openings in the tube sheet at the permeate end are the same size as the tubes.

Referring to this figure, flange, 57 at the end of the shell, 51, has bolt holes, 58, for attaching the head. Within the shell, the face of the permeate-end tube sheet, 52, and seven end plates, 53, can be seen. These end plates cover seven openings in the tube sheet, indicated by dashed circles, 54, that correspond in diameter to the ends of the tubes. The end plates are circular metal plates pierced by the permeate extension pipes, 55, and have diameters larger than the diameters of the tube openings that they cover. The plates have bolt holes, 56, positioned near their outer edges so as to overlap corresponding bolt holes in the tube sheet.

Figure 6:
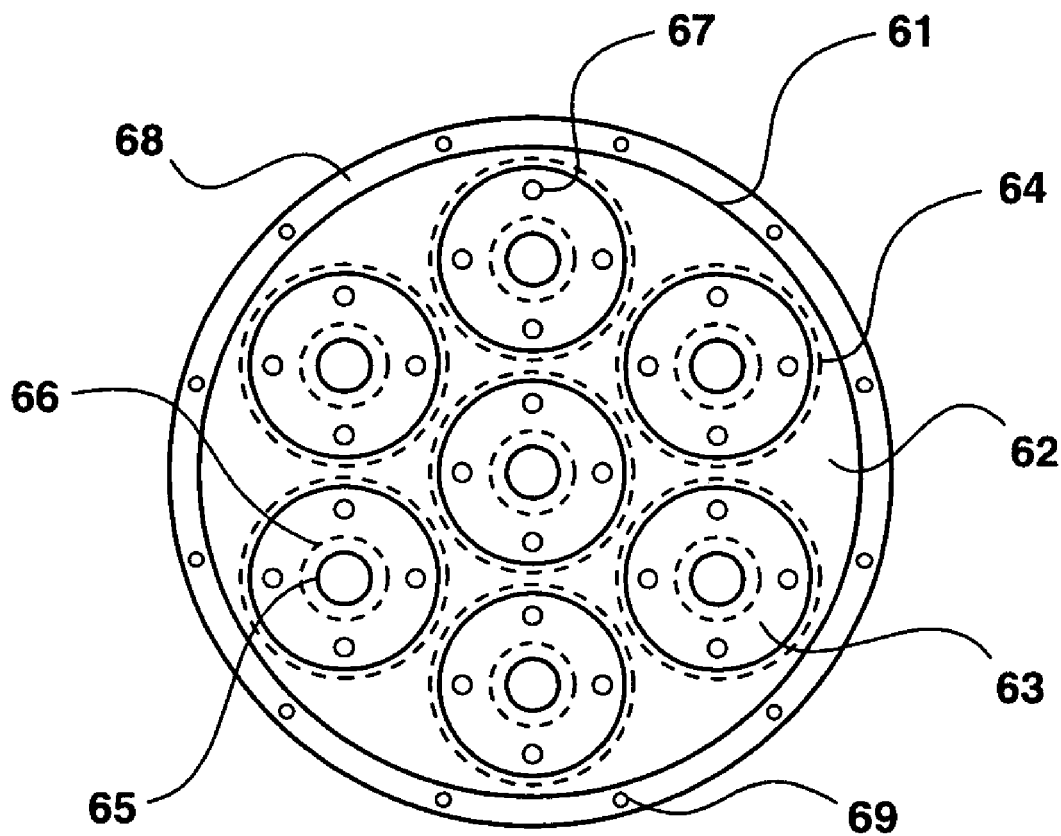
FIG. 6 is a schematic cross-sectional drawing showing attachment of the end plates in an embodiment in which the permeate-end tube sheet has openings of smaller diameter than the tubes.

FIG. 6 shows a cross-sectional layout diagram of an alternative assembly, also containing seven tubes. In this embodiment, the openings in the tube sheet at the permeate end are smaller than the tube diameters.

Referring to this figure, flange, 68 at the end of the shell, 61, has bolt holes, 69, for attaching the head. Within the shell, the face of the permeate-end tube sheet, 62, and seven end plates, 63, can be seen. These end plates cover seven openings in the tube sheet, indicated by dashed circles, 66. These openings are much smaller than the diameters of the ends of the tubes, indicated by dashed circles, 64. The end plates are pierced by permeate extension pipes, 65, and have diameters no larger than the diameters of the tube openings. The plates have bolt holes, 67, that overlap corresponding bolt holes in the tube sheet.

In FIGS. 5 and 6, the diameters of the tubes are assumed to be the same and the circles representing the position of the tube ends are drawn the same size. As can be seen by comparing the diameters of the vessels in the two figures, however, a much smaller vessel is needed for the embodiment shown in FIG. 6.

Figure 7:
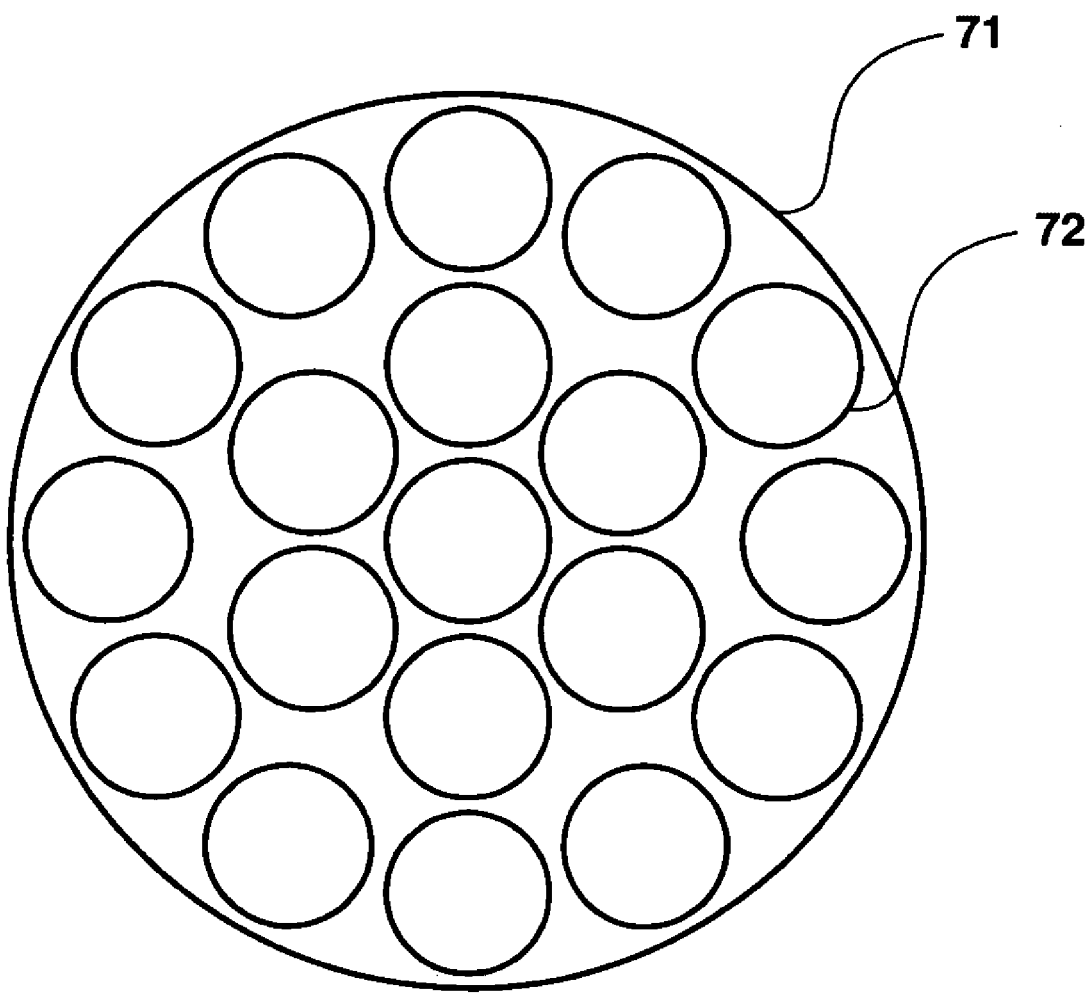
FIG. 7 is a schematic cross-sectional drawing showing placement of 19 tubes in the assembly.

FIG. 7 is a schematic cross-sectional drawing showing how the tubes could be arranged in a vessel, 71, having 19 tubes, 72.

In another aspect, the invention is a gas separation process using the assembly in any of its embodiments. For example, referring again to FIG. 1, a feed gas mixture to be treated is introduced into port 10 and enters the first end space 5. From here the gas is directed into the membrane modules 9.

A driving force for transmembrane permeation is provided, usually by ensuring that there is a pressure difference between the feed and permeate sides of the membranes. This may involve compressing the feed gas, and/or drawing the permeate gas through a vacuum pump, for example, or any other method known in the art.

The feed gas mixture passes through the modules and is separated into two portions: a residue gas stream, that has not permeated the membranes, and a permeate gas stream, that has permeated the membranes. The residue gas stream passes from the tubes 8 through opening 15 into middle space 6 and is withdrawn through port 12. The permeate gas stream passes into the second end space 7 and is withdrawn through port 11.

Similar gas flow schemes can also be used for the embodiments shown in the other figures.

An alternative process embodiment is to introduce the feed gas through port 12 and withdrawn the residue gas through port 10. In this embodiment, the feed gas stream enters middle space 6 and flows from there into the tubes 8 through openings 15. The gas then enters the membrane modules at this end, flows along them and is withdrawn into space 5 and out through port 10. The permeate gas stream flows as before and is collected in space 7 and withdrawn through port 11.

As can be seen, this mode of operation of the assembly provides an overall feed gas flow in the right-to-left direction with respect to the figures, and an overall permeate gas flow in the left-to-right direction. Depending on the geometry and flow patterns within the modules themselves, this may provide at least partial countercurrent flow between feed and permeate gases, thereby enhancing the separation achieved by the process.

The process as described above may be used to separate any gas or gases from any gas mixture. It is believed that the process is particularly useful for natural gas treatment, such as to separate carbon dioxide, nitrogen or hydrocarbons from natural gas.

The invention is now illustrated in further detail by specific examples. These examples are intended to further clarify the invention, and are not intended to limit the scope in any way.

EXAMPLES

Example 1

Comparison of Skid Size Requirements for Gas Separation System Using Conventional Pressure Tubes, Seven-Tube Vessels and 19-Tube Vessels An approximate comparison was made of the skid size that is needed to provide sufficient membrane capacity for a system constructed using prior art pressure tubes or the multi-tube pressure vessels of the invention.

Figure 8:
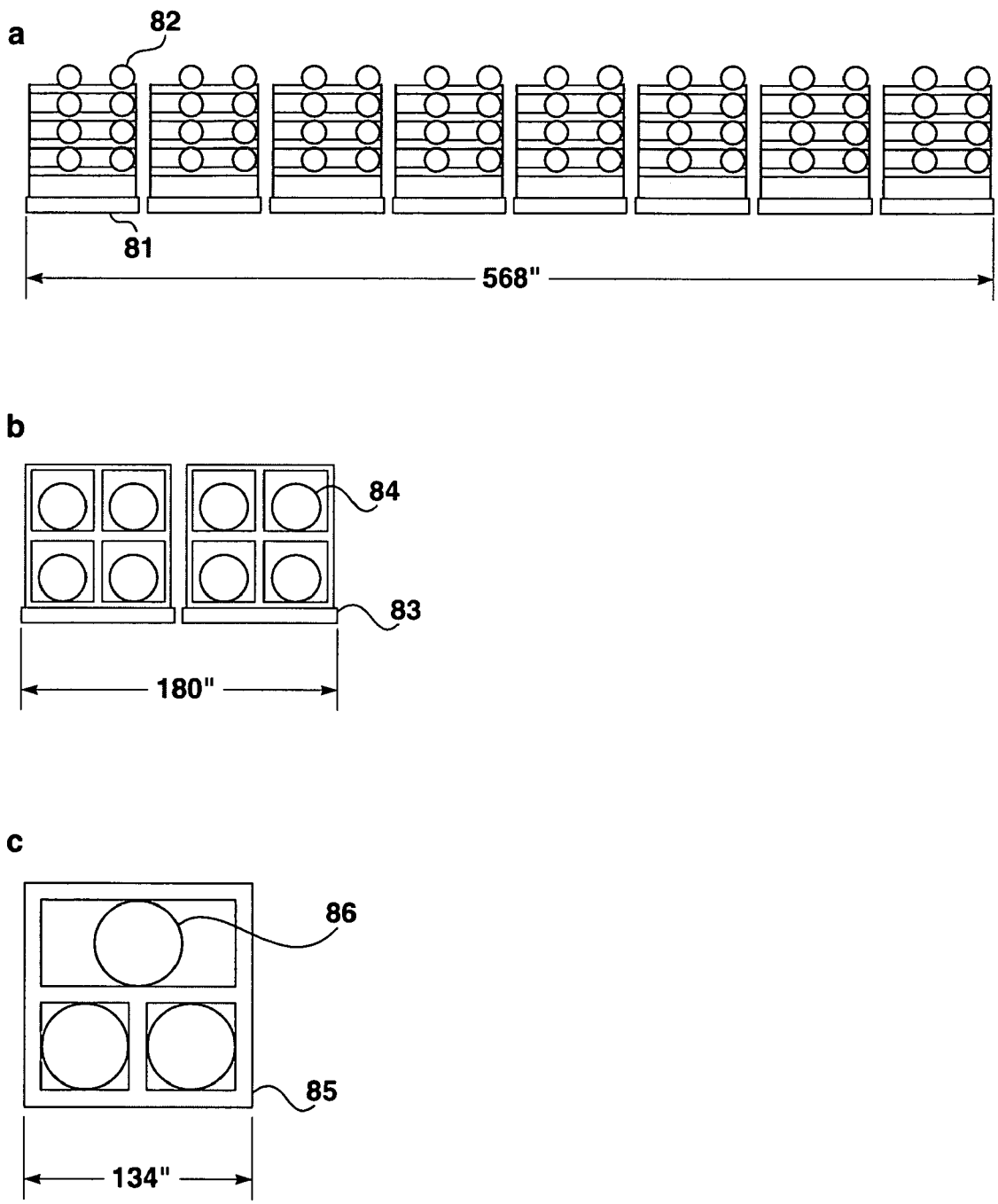
FIG. 8 is a diagram comparing the space requirements for three gas-separations assemblies.

FIG. 8 illustrates the difference in footprint requirements for a gas-separation system using a conventional pressure vessel, a seven-tube vessel and a 19-tube vessel. The system was assumed to need about 4,500 to 5,000 $m^2$ of membrane area in the form of spiral-wound modules and to be operating at a feed pressure of about 500 psi. In each case, the membrane modules are arranged in an end-to-end series of 4 modules inside a tube, and the length of the skid is about 23 feet. The difference in size is evident in the different widths.

FIG. 8 (*a*) shows a conventional configuration, not in accordance with the invention. The tube that contains the modules also serves as the pressure vessel so that each pressure vessel contains four modules. The system requires eight skids, 81, each holding eight pressure vessels, 82. The configuration as shown in FIG. 8(*a*) uses 256 modules and the total amount of membrane area is 5,120 $m^2$. Each skid is about six feet wide. The total area or footprint required per skid is 6×23 or about 140 $ft^2$. The total footprint required for 5,120 $m^2$ of membrane is thus 140×8 or 1,120 $ft^2$.

FIG. 8 (*b*) shows a seven-tube pressure vessel skid configuration in accordance with the invention. The system requires two skids, 83, each holding four pressure vessels, 84. Each pressure vessel contains seven tubes. The configuration as shown in FIG. 8 (*b*) uses 224 modules and the total amount of membrane area is 4,480 $m^2$. Each skid is 7.5 feet wide with a footprint of 7.5×23 or about 170 $ft^2$. The total footprint required for 4,480 $m^2$ of membrane is thus 170×2 or 340 $ft^2$. Compared with FIG. 8 (*a*) above, the membrane system uses about one third the footprint required for the conventional system.

FIG. 8 (*c*) shows a 19-tube pressure vessel skid configuration in accordance with the invention. The system requires one skid, 85, using 3 pressure vessels, 86. Each pressure vessel contains 19 tubes. The configuration as shown in FIG. 8 (*c*) uses 228 modules and the total amount of membrane area for this configuration is 4,560 $m^2$. The skid is 11 feet wide with a footprint of 11×23 or about 250 $ft^2$. The total footprint required for 4,560 $m^2$ of membrane is thus 250 $ft^2$. Compared with FIG. 8 (*a*) above, the membrane system uses under one quarter the footprint required for the conventional system.

As can be seen, multi-tube vessels substantially reduce the footprint size of the system. The weight is also reduced.

Example 2

Complexity Comparison of Conventional Pressure Tube, 7-Tube Vessel and 19-Tube Vessel Skid Configurations Table 1 compares some properties of standard skid configurations containing roughly comparable membrane area as illustrated in FIG. 8. Using the number of connection features (such as flanges) and tubes as one measure of complexity, it can be seen that seven- or 19-tube pressure vessels greatly decrease the complexity of the skid configuration.

TABLE 1

| Vessel Type | Number of skids | Vessels per skid | Total Vessels | Total footprint (ft²) | Total membrane area (m²) | Total Flanges |
|---|---|---|---|---|---|---|
| Conventional | 8 | 8 | 64 | 1,120 | 5,120 | 192 |
| 7-tube | 2 | 4 | 8 | 340 | 4,480 | 24 |
| 19-tube | | 3 | 3 | 250 | 4,560 | 9 |

Example 3

Comparison of Vessel Diameters for Pressure Vessels Containing Seven Tubes

A calculation was performed to compare the pressure vessel diameter needed to house seven tubes according to the arrangements shown in FIGS. 5 and 6. Both drawings are cross-sectional schematics showing the face of a tube sheet in a pressure vessel operating at about 700 psi. For both embodiments, the tubes within the pressure vessel are 8 inches in diameter. The schematics in FIGS. 5 and 6 show that it takes three tubes to span to the diameter of the pressure vessel. A tolerance of one quarter to one eighth inch is allowed for the end-plate diameters.

FIG. 5 shows a tube sheet at the permeate end of a pressure vessel For the embodiment as shown in FIG. 5, the tube sheet, 52, has openings that are eight inches in diameter, 54, and end plates, 53, that are 13 inches in diameter. The openings are large enough to allow tubes to pass through the tube sheet.

For the embodiment shown in FIG. 6, the tube sheet, 62, has openings that are five and one half inches in diameter, 66, and end plates, 63, that are 9 inches in diameter. The openings are large enough to allow a permeate pipe to extend through the holes, but the eight inch tubes may not pass through.

The vessel diameter in each case was determined by taking the above measurements, including tolerances, and adding them up across the diameter of the vessel. The results of these calculations are summarized in Table 2 below.

TABLE 2

(seven-tube vessel)

| Permeate-end configuration | FIG. 5 | FIG. 6 |
|---|---|---|
| Diameter of openings in tube sheet (in) | 8 | 5.5 |
| Spacing between openings (in) | 5 | 3.5 |
| Diameter of end plates (in) = x | 13 | 9 |
| Tolerance between plates (in) = y | 0.5 | 0.25 |
| Tolerance of plates to inner wall of vessel (in) = z | 0.25 | 0.125 |
| Vessel wall thickness, including flange width (in) = w | 4 | 4 |
| Inner diameter of vessel (in) = 3x + 2y + 2z | 41 | 27.75 |
| Outer diameter of vessel (in) = 2w + 3x + 2y + 2z | 49 | 35.75 |

From Table 2, it can be seen that the vessel diameter is reduced by about 30% by using the FIG. 6 arrangement. This provides considerable savings in vessel size and weight but the vessel would have to be opened at both the feed and permeate ends to replace modules.

Example 4

Comparison of Vessel Diameters for Pressure Vessels Containing 19 Tubes

The steps used to arrive at a pressure vessel diameter for the seven-tube embodiment of the invention in Example 3 may be repeated to determine the diameter in a 19-tube embodiment. From FIG. 7, it can be seen that 5 tubes span the diameter of the pressure vessel. Table 3 shows the measurements and calculations for this embodiment.

TABLE 3

(19-tube vessel)

| Permeate-end configuration | FIG. 5 | FIG. 6 |
|---|---|---|
| Diameter of openings in tube sheet (in) | 8 | 5.5 |
| Spacing between openings (in) | 5 | 3.5 |
| Diameter of end plates (in) = x | 13 | 9 |
| Tolerance between plates (in) = y | 0.5 | 0.25 |
| Tolerance plates to inner wall of vessel (in) = z | 0.25 | 0.125 |
| Vessel wall thickness, including flange width (in) = w | 6 | 6 |
| Inner diameter of vessel (in) = 5x + 4y + 2z | 67.5 | 46.5 |
| Outer diameter of vessel (in) = 2w + 5x + 4y + 2z | 79.5 | 58.5 |

From Table 3, it can be seen that the vessel diameter is again reduced by about 30% by using the closer tube packing arrangement.

We claim:

1. A gas-separation assembly, comprising:
   (a) a plurality of tubes each having a longitudinal tube wall and a tube interior containing gas separation membranes;
   (b) a housing containing the tubes, the housing having a housing interior and comprising a feed end, a permeate end and a central portion between the ends;
   (c) a feed-end tube sheet mounted in the housing towards the feed end;
   (d) a permeate-end tube sheet mounted in the housing towards the permeate end;
   the tube sheets dividing the housing interior into three separate gas-tight spaces: (i) a feed gas space at the feed end, (ii) a permeate gas space at the permeate end, and (iii) a residue gas space in the central portion between the feed and permeate spaces, and in which the tubes are mounted in spaced-apart relationship with each other;
   the feed-end tube sheet having a plurality of feed openings that provide gas-transferring communication between the tube interior and the feed gas space; and
   the permeate-end tube sheet having a plurality of permeate openings that provide gas-transferring relationship between the membranes and the permeate end space;
   (e) a feed gas port at the feed end;
   (f) a permeate gas port at the permeate end;
   (g) a residue gas port in the central portion;
   (h) at least one aperture in each longitudinal tube wall enabling residue gas to flow from the tube interior to the residue gas space.

2. The assembly of claim 1, wherein the membranes are packaged into membrane elements.

3. The assembly of claim 1, wherein the membranes are flat-sheet membranes packaged into spiral-wound modules.

4. The assembly of claim 1, wherein the membranes are hollow fibers potted into hollow-fiber modules.

5. The assembly of claim 1, wherein the membranes are packaged into membrane elements, and wherein each tube contains multiple membrane elements arranged in series.

6. The assembly of claim 1, wherein the housing is made of steel.

7. The assembly of claim 1, wherein the housing is code-stamped for at least 500 psi and the tubes are not code-stamped.

8. The assembly of claim 1, wherein the housing is code-stamped for at least 1,000 psi and the tubes are not code-stamped.

9. The assembly of claim 1, further comprising, for each tube:
(I) at least one permeate collection pipe in gas-transferring relationship with the gas-separation membranes;
(II) a permeate extension pipe, connected to the permeate collection pipe by a connector, the connected pipes protruding longitudinally out of the tube;
(III) an opening in the permeate-end tube sheet of a diameter approximately the same as the connector, and large enough to permit the permeate extension pipe and the connector to slide through the opening.

10. The assembly of claim 1, wherein the feed end comprises a reversibly removable head.

11. The assembly of claim 1, wherein the permeate end comprises a reversibly removable head.

12. The assembly of claim 1, wherein the central portion comprises a shell and the feed end and the permeate end comprise reversibly removable heads.

13. The assembly of claim 12, wherein the heads are bolted to the shell portion.

14. The assembly of claim 12, wherein the heads are screwed to the shell portion.

15. The assembly of claim 1, wherein the plurality of tubes is 7 tubes.

16. The assembly of claim 1, wherein the plurality of tubes is 19 tubes.

17. A gas-separation assembly, comprising:
(a) a plurality of tubes, each having a longitudinal tube wall and a tube interior containing at least one spiral-wound membrane module, the module having a protruding permeate pipe;
(b) a housing containing the tubes, the housing having a housing interior and comprising a removable feed head, a removable permeate head and a shell between the heads;
(c) a feed-end tube sheet mounted in the housing towards the feed head, the feed-end tube sheet containing a feed opening for each tube of a first diameter approximately the same as the tube, the tubes being aligned over the feed openings and attached to the feed-end tube sheet so as to provide a gas-tight seal between the tubes and the feed-end tube sheet;
(d) a permeate extension pipe, connected to the permeate pipe by a connector, the connected pipes protruding longitudinally out of the tube;
(e) a permeate-end tube sheet mounted in the housing towards the permeate head, the permeate-end tube sheet containing a permeate opening for each permeate extension pipe of a second diameter approximately the same as the connector, and large enough to permit the connector and the permeate extension pipe to slide through the permeate opening;
(f) an end plate attached to the permeate extension pipe and reversibly sealed to the permeate-end tube sheet in gas-tight manner around the permeate openings;
the tube sheets dividing the housing interior into three separate gas-tight spaces: (I) a feed gas space adjacent to the feed head, (II) a permeate gas space adjacent to the permeate head, and (III) a residue gas space inside the shell between the feed and permeate spaces and containing the tubes;
(g) a feed gas port in the feed head;
(h) a permeate gas port in the permeate head;
(i) a residue gas port in the shell;
(j) at least one aperture in each longitudinal tube wall enabling residue gas to flow from the tube interior to the residue gas space.

18. The assembly of claim 17, wherein each tube contains at least two membrane modules arranged in series, with the permeate pipe of the first module connected to the permeate pipe of the second module so that permeate gas may flow from the first permeate pipe into the second permeate pipe.

19. The assembly of claim 17, wherein the housing is made of steel.

20. The assembly of claim 17, wherein the heads are bolted to the shell.

21. The assembly of claim 17, wherein the heads are screwed to the shell.

22. The assembly of claim 17, wherein the membranes are polymeric membranes having a rubbery selective layer.

23. The assembly of claim 17, wherein the membranes are polymeric membranes having a glassy selective layer.

24. The assembly of claim 17, wherein the plurality of tubes is 7 tubes.

25. A gas-separation assembly, comprising:
(a) a vessel having an outer wall and an interior space divided into three gas-tight spaces: a first end space, a second end space and a middle space between the end spaces;
(b) a plurality of tubes, each having a tube interior containing at least one membrane module, the tubes being mounted in the middle space;
(c) three ports in the outer wall, one for each space, that enable gas to flow between an environment outside the vessel and the space;
(d) first means to allow gas flow between the first space and the tubes;
(e) second means to collect a permeate gas from a permeate region of the membrane modules and allow gas flow between the permeate region and the second end space;
(f) third means to allow gas to flow between the tube interiors and the middle space.

26. The assembly of claim 25, wherein the first means comprises a first tube sheet dividing the first end space from the middle space and having a plurality of openings aligned with the tubes, and wherein the first tube sheet is sealed to the tubes in gas-tight manner around the openings.

27. The assembly of claim 25, wherein the second means comprises:
(i) for each tube, a permeate collection pipe protruding from the membrane module;
(ii) for each tube, a permeate extension pipe connected to the permeate collection pipe by a connector, the connected pipes protruding longitudinally out of the tube;
(iii) a second tube sheet having, for each tube, an opening of a diameter approximately the same as the connector, and large enough to permit the permeate extension pipe and connector to slide through the opening;
and wherein each permeate extension pipe is sealed to the second tube sheet in gas-tight manner around each opening.

28. The assembly of claim 25, wherein the tubes each have a longitudinal tube wall and the third means comprises an aperture in the tube wall.

29. The assembly of claim 25, wherein, wherein the vessel is code-stamped for at least 500 psi and the tubes are not code-stamped.

30. The assembly of claim 1, wherein the vessel is code-stamped for at least 1,000 psi and the tubes are not code-stamped.

31. A gas-separation process using the assembly of claim 25, and comprising:

(a) introducing a feed gas mixture into the port in the first end space and allowing the feed gas mixture to flow into the membrane module and along a gas separation membrane having a feed side and a permeate side that is contained within the module;

(b) providing a driving force to induce permeation of a first portion of the feed gas mixture from the feed side to the permeate side;

(c) withdrawing from the port in the second end space a permeate gas mixture comprising the first portion;

(d) withdrawing from the port in the middle space as a residue gas stream a second portion of the feed gas mixture that has not permeated the membrane.

32. The process of claim 31, wherein the feed gas mixture is natural gas.

33. A gas-separation process using the assembly of claim 25, and comprising:

(a) introducing a feed gas mixture into the port in the middle space and allowing the feed gas mixture to flow into the membrane module and along a gas separation membrane having a feed side and a permeate side that is contained within the module;

(b) providing a driving force to induce permeation of a first portion of the feed gas mixture from the feed side to the permeate side;

(c) withdrawing from the port in the second end space a permeate gas mixture comprising the first portion;

(d) withdrawing from the port in the first end space as a residue gas stream a second portion of the feed gas mixture that has not permeated the membrane.

34. The process of claim 33, wherein the feed gas mixture is natural gas.

* * * * *